No. 868,706.
PATENTED OCT. 22, 1907.
F. W. SCHEPMAN & J. M. TEAMER.
SHEARS.
APPLICATION FILED JULY 21, 1905.
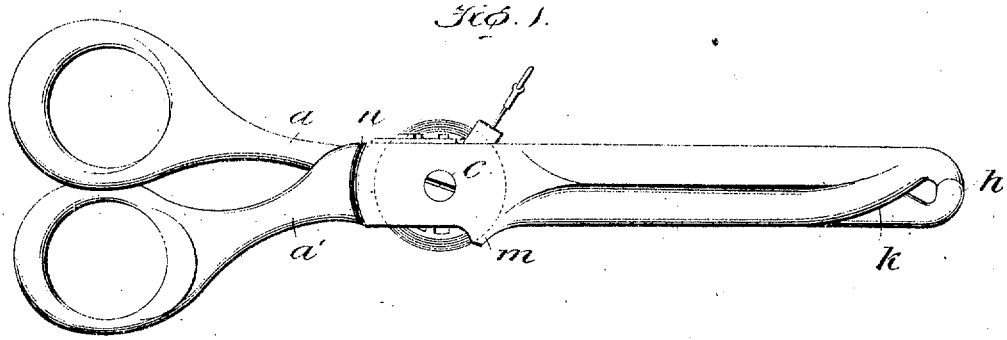
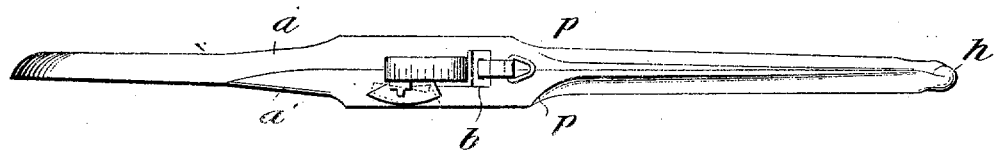
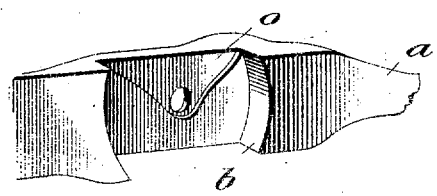
Witnesses
Inventors
Frederick W. Schepman
and
James M. Teamer
By Frank C. Gore
their Attorney

UNITED STATES PATENT OFFICE.

FREDERICK WILLIAM SCHEPMAN AND JAMES MADISON TEAMER, OF EVANSVILLE, INDIANA, ASSIGNORS OF ONE-THIRD TO JOHN HERMAN DERSCH, OF EVANSVILLE, INDIANA.

SHEARS.

No. 868,706.　　　　　Specification of Letters Patent.　　　　　Patented Oct. 22, 1907.

Application filed July 21, 1905. Serial No. 270,670.

*To all whom it may concern:*

Be it known that we, FREDERICK WILLIAM SCHEPMAN and JAMES MADISON TEAMER, both citizens of the United States, and residents of Evansville, in the county of Vanderburg and State of Indiana, have invented a new and Improved Shears, of which the following is a full, clear, and exact description.

Our invention relates to scissors or shears.

Scissors and shears as heretofore constructed have been seriously defective at the pivot screw inasmuch as this screw has to be quite tight if the blades are to cut closely which increases the labor of using the scissors or shears while, on the other hand, if the screw is loosened to render the use of the shears or scissors less laborious, the blades wabble and cut unsatisfactorily; another defect is the liability of rust gathering around the screw if it remains loose.

To overcome the foregoing defects, we provide the inner faces of the blades of scissors or shears with recessed or cut away portions at their pivotal parts and position the pivot screw centrally of said recessed parts. This results in a thinning of the blades and relieves them of great stiffness at their pivotal parts and enables the screw to be tightened without causing great friction at the pivot and yet, on account of the decreased thickness of the blades around the pivot, they yield to the tightening of the pivot screw and a tensioning effect is produced thereat which causes the blades to shear or cut close to each other, enabling clean cutting effects to be had without increase of labor in using the shears or scissors and obviating wabbling blades, the accumulation of rust and other disadvantages. We also provide a novel construction at the tips of the blades in the form of projections which have flat inner faces that are adapted to meet beyond the termination of the cutting edges of the blades in the line of such cutting edges and thereby obtain means for engaging and supporting the material to be cut directly in line with the cutting-edges, facilitating the operation of cutting, preventing injury to the material, and also preventing the tips of the blades from passing out of the cut.

In the present invention means are also provided for keeping the material being cut from entering or catching the pivotal parts of the shears or scissors.

In the accompanying drawings:—Figure 1 is a side elevation; Fig. 2, a plan; Fig. 3, an enlarged detail showing the recess at the pivot in one of the blades; Fig. 4, an end view at the tips of the scissors or shears.

Referring to the first three figures, we have shown two shear members $a$ and $a'$. Each of these members is provided with a recess or offset $b$ centrally located with respect to a pivot screw $c$ of the shears, and adapted to receive a tape measure of any suitable construction.

The recessed part $b$ of the members of the shears act as a tension, as it is bow-shaped, and when the parts are drawn together by the screw $c$ has a tendency to bring and hold the cutting edges of the blades together, especially at the points. The recesses $b$ thin the material around the pivot screw and render it springy or yieldable thereat so that on tightening the pivot screw $c$, a tension will be exerted at the pivotal parts which will cause the blades to shear or cut close and facilitate clean cutting without increasing the labor of the operation and this construction obviates all wabbling of the blades. We have also shown the shears, as provided with projections $h$. These projections, shown in both forms illustrated, engage each other at a point beyond the ends $k$ of the cutting-edges of the two shear members and form a flat surface between them, which is adapted to engage the cloth or other material being cut at a point directly in line with the cutting-edges. This formation of the ends of the blades accomplishes two purposes. First, it allows a full closing of the blades to the ends of their cutting-edges without disengaging the latter from the material upon which they are operating. When long, rapid cutting is required, on material that will not rip, or paper, and on curved, irregular cutting, this is very useful. One difficulty in these forms of cutting has always been that when the shears cut to their points, one point or the other passes to the wrong side of the material being cut, and it is necessary then to guide the shears back to the cut in the material, which results in a loss of time, and also may result in starting the new cut at a slight angle to the old. In addition to this, the enlargement $h$ of the lower blade is always in advance of the cutting edge when closed and it therefore holds up the material so the shears can be pushed forward, using the full sweep of the blades without making any effort to guide the shears in a vertical direction or to keep them in engagement with the material. This prevents the shears from injuring the material, getting out of line, and from slipping out of the cut. An additional advantage of these enlargements will also be observed. Shears are frequently used in decorating or arranging decorations in dry-goods stores, and other places, and the abutting flat surfaces of these enlargements can be employed for gripping pins and pulling them out of their places. The form of shears shown in the first three figures is especially adapted for the use of dry-goods clerks, although it is also capable of general use, and its utility will not be materially lessened in any of the purposes for which shears are ordinarily employed.

We have also shown an extension $m$ on one of the blades for keeping the material being cut from entering the recess $b$. This extension may be applied to both blades, so as to permit cutting with the shears inverted. The way in which this extension works will be obvious when it is understood that upon the opening of the shears to their extreme limit this extension will not pass beyond the edge of the other blade, thus keeping the cloth well within the space between the blades. Another extension $n$ is also shown on one of the handles of the blades, to act as a bearing when the shears are opened to their full extent.

In Fig. 3 is illustrated the inner construction of the two members or blades of the shears or scissors, in which a recess $o$ is provided. At $p$ Fig. 2 are shown rounded shoulders to prevent the shears from catching in the cloth when taken from or placed in the pockets.

Having thus described our invention, we claim as new and desire to secure by Letters Patent:

1. Scissors or shears having one of the blades thereof provided with a recess in its inner face at its pivotal part, and a single screw-pivot directly connecting the said recessed part of the blade with the other blade and constituting the sole means for fastening the blades together.

2. Scissors or shears having opposing recesses in their inner faces at their pivotal part, and a single screw-pivot directly connecting the recessed parts of the blades together and constituting the sole means for fastening the blades together.

3. Scissors or shears having blades, one of which is provided at its tip with a blunt projection located beyond and separated from the termination of the cutting edges of the blades.

4. Scissors or shears having blades which are provided at their tips with blunt projections adapted to abut each other and located beyond and separated from the termination of the cutting edges of the blades.

5. Scissors or shears having blades which are provided at their tips with blunt projections having faces located in the line of the cutting edges of the blades beyond the termination of said cutting edges and adapted to abut each other.

6. Scissors or shears having a projection or extension on the edge of a blade thereof in front of the pivotal part thereof and in the same general plane of the blades, said projection extending beyond the outer edges of both blades when closed.

In testimony whereof we have signed our names to this specification in the presence of two subscribing witnesses.

FREDERICK WILLIAM SCHEPMAN.
JAMES MADISON TEAMER.

Witnesses as to Frederick William Schepman:
W. D. BRABENDER,
FRANK H. VERNOR.

Witnesses as to James Madison Teamer:
OTTO G. GEISS,
JAMES T. WALKER.